US012637106B2

(12) United States Patent
Terechko et al.

(10) Patent No.: US 12,637,106 B2
(45) Date of Patent: May 26, 2026

(54) CROSS-CHANNEL SAFETY ANALYSIS OF REDUNDANT MPC-BASED VEHICLE CONTROLLERS IN AUTONOMOUS SYSTEMS

(71) Applicant: NXP USA, Inc., Austin, TX (US)

(72) Inventors: Andrei Sergeevich Terechko, Eindhoven (NL); Yuting Fu, Valkenswaard (NL); Jochen Seemann, Leonberg (DE)

(73) Assignee: NXP USA, Inc., Austin, TX (US)

( * ) Notice: Subject to any disclaimer, the term of this patent is extended or adjusted under 35 U.S.C. 154(b) by 335 days.

(21) Appl. No.: 18/210,723

(22) Filed: Jun. 16, 2023

(65) Prior Publication Data

US 2024/0416962 A1     Dec. 19, 2024

(51) Int. Cl.
*B60W 60/00*          (2020.01)
*B60W 50/00*          (2006.01)

(52) U.S. Cl.
CPC .... *B60W 60/0015* (2020.02); *B60W 50/0097* (2013.01); *B60W 2420/403* (2013.01); *B60W 2420/408* (2024.01); *B60W 2420/54* (2013.01); *B60W 2554/20* (2020.02); *B60W 2554/4026* (2020.02); *B60W 2554/4029* (2020.02)

(58) Field of Classification Search
CPC ......... B60W 60/0015; B60W 50/0097; B60W 2420/403; B60W 2420/408; B60W 2420/54
See application file for complete search history.

(56) References Cited

U.S. PATENT DOCUMENTS

| 10,969,035 B2 | 4/2021 | Williams et al. | |
| 11,981,349 B2 * | 5/2024 | Nister | B60W 60/001 |
| 2020/0385008 A1 * | 12/2020 | Terechko | G05D 1/0088 |

(Continued)

FOREIGN PATENT DOCUMENTS

| CN | 111007713 A | 4/2020 |
| DE | 102021114768 A1 | 6/2022 |
| DE | 102021213077 A1 | 5/2023 |

OTHER PUBLICATIONS

Michele Arnold et al., Multi-Area Predictive Control for Combined Electricity and Natural Gas Systems, Mar. 2015.

(Continued)

*Primary Examiner* — Toya Pettiegrew

(57) ABSTRACT

A motion plan safety analysis is performed by processing vehicle sensor signals to generate a motion plan which includes a reference trajectory value, by processing the reference trajectory value at a first MPC to generate a first current setpoint and a first plurality of future setpoints, by processing the first plurality of future setpoints at a second MPC to generate a second plurality of future setpoints, by processing the second plurality of future setpoints at the first MPC to generate a first plurality of predicted trajectory states, by processing the first plurality of future setpoints at the second MPC to generate a second plurality of predicted trajectory states, by evaluating the predicted trajectory states to generate a predetermined safety reaction for the vehicle, and by choosing between the first and second current setpoints based on the safety reaction to provide a safest setpoint to a vehicle actuator in the vehicle.

20 Claims, 7 Drawing Sheets

(56) References Cited

U.S. PATENT DOCUMENTS

| | | | | |
|---|---|---|---|---|
| 2021/0394770 A1* | 12/2021 | Rocha | ............. | B60W 60/00186 |
| 2024/0092357 A1* | 3/2024 | Kobilarov | ......... | B60W 30/0956 |

OTHER PUBLICATIONS

John Phillips et al., Deep Multi-Task Learning for Joint Localization, Perception, and Prediction, Apr. 10, 2021.

Philip Koopman, Carnegie Mellon University, Safety Performance Indicators (SPIs) for Autonomous Vehicles, 2002.

Scott Drew Pendleton et al., Perception, Planning, Control, and Coordination for Autonomous Vehicles, Machines 2017, published Feb. 17, 2017.

Vesselin P. Jilkov et al., Multiple Model Method for Aircraft Conflict Detection and Resolution in Intent and Weather Uncertainty, IEEE Transactions on Aerospace and Electronic Systems, vol. 55, No. 2, pp. 1004-1020, Apr. 2019, doi: 10.1109/TAES.2018.2867698.

Kirill Gorelik et al., Optimal, Adaptive and Predictive Real-Time Control of Fail-Operational Powertrain for Automated Electric Vehicles, 2018 IEEE Transportation Electrification Conference and Expo (ITEC), Long Beach, CA, USA, 2018, pp. 977-984, doi: 10.1109/ITEC.2018.8450236.

V. Bagyaveerswaran et al., Performance comparison of next generation controller and MPC in real time for a SISO process with low cost DAQ unit, Alexandria Engineering Journal (2016) 55, 2515-2524, Aug. 21, 2016.

Karan Chatrath et al., Vehicle Dynamics Control Using Model Predictive Control Allocation Combined with an Adaptive Parameter Estimator, SAE International Journal of Connected and Automated Vehicles, Jul. 2020.

Jamil Fayyad et al., Deep Learning Sensor Fusion for Autonomous Vehicle Perception and Localization: A Review, MDPI, Sensors, Jul. 29, 2020.

* cited by examiner

300

500

700

| | PREDICTED TRAJECTORY A' IS SAFE? | PREDICTED TRAJECTORY A' RESEMBLES REFERENCE TRAJECTORY 2? | PREDICTED TRAJECTORY B' IS SAFE? | PREDICTED TRAJECTORY B' RESEMBLES REFERENCE TRAJECTORY 1? | SAFETY REACTION | COMMENT |
|---|---|---|---|---|---|---|
| 701 → | YES | YES | YES | YES | NONE | SAFE VEHICLE OPERATION |
| 702 → | NO | YES | YES | YES | WARN PASSENGERS | SUSPICIOUS REFERENCE TRAJECTORY 2, IS THE CORRESPONDING MOTION PLANNER UNSAFE? |
| 703 → | YES | NO | YES | YES | WARN PASSENGERS | CAR MODELS MISMATCH IN MPC A AND MPC B, BUT THE SETPOINTS ARE SAFE ACCORDING TO BOTH CHANNELS |
| 704 → | NO | NO | YES | YES | WARN PASSENGERS | SUSPICIOUS OPERATION OF MPC B |
| 705 → | YES | YES | NO | YES | WARN PASSENGERS, SWITCH TO MPC B | SUSPICIOUS REFERENCE TRAJECTORY 1, IS THE CORRESPONDING MOTION PLANNER UNSAFE? |
| 706 → | YES | YES | YES | NO | WARN PASSENGERS | CAR MODELS MISMATCH IN MPC A AND MPC B, BUT THE SETPOINTS ARE SAFE ACCORDING TO BOTH CHANNELS |
| 707 → | YES | YES | NO | NO | WARN PASSENGERS, SWITCH TO MPC B | SUSPICIOUS OPERATION OF MPC A |
| 708 → | YES | NO | YES | NO | WARN PASSENGERS | CAR MODELS MISMATCH IN MPC A AND MPC B, BUT THE SETPOINTS ARE SAFE ACCORDING TO BOTH CHANNELS |
| 709 → | NO | NO | NO | NO | WARN PASSENGERS, SAFE MANEUVER | RISKY DISAGREEMENT BETWEEN BOTH CHANNELS |

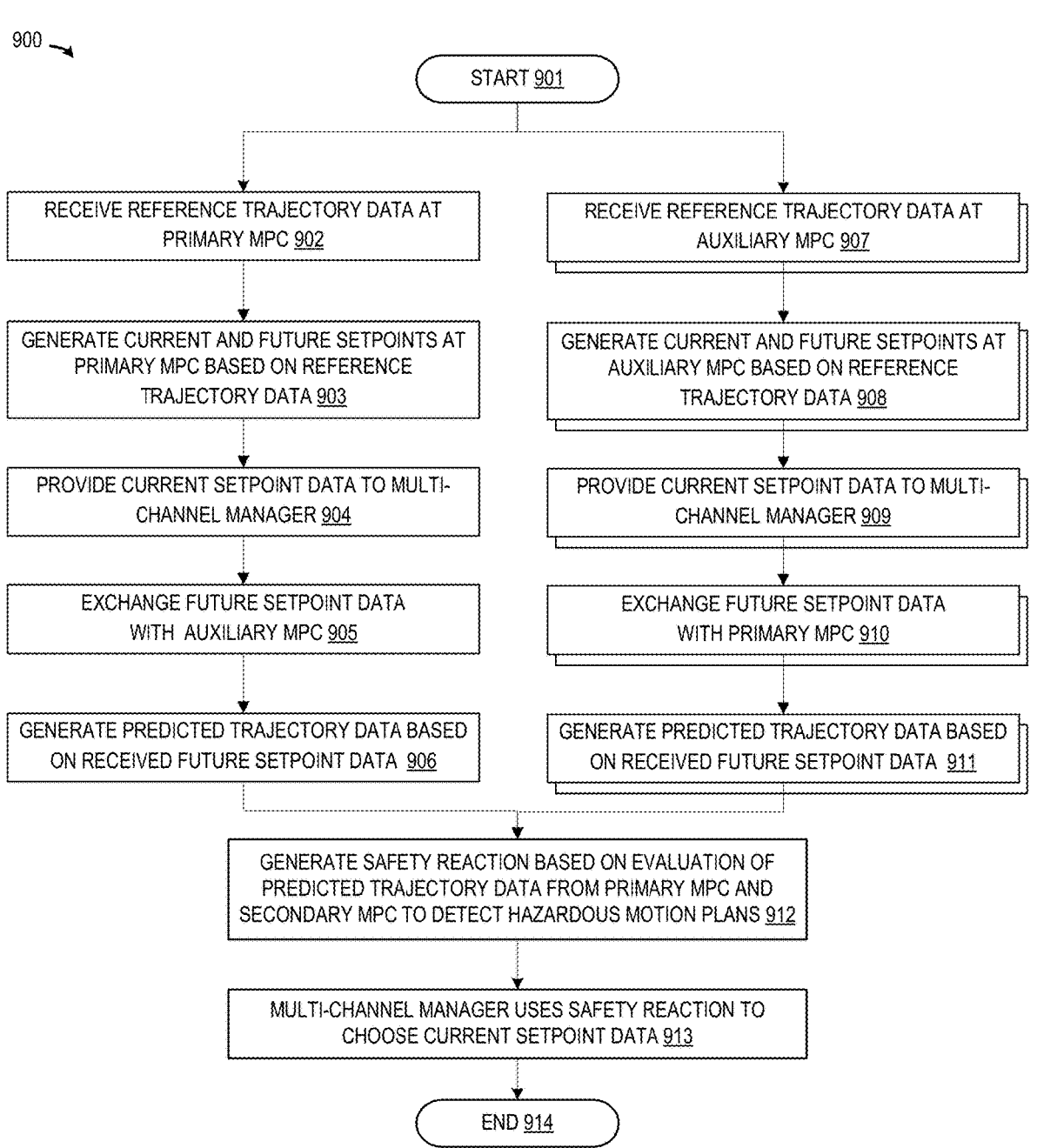

START 901

RECEIVE REFERENCE TRAJECTORY DATA AT PRIMARY MPC 902

RECEIVE REFERENCE TRAJECTORY DATA AT AUXILIARY MPC 907

GENERATE CURRENT AND FUTURE SETPOINTS AT PRIMARY MPC BASED ON REFERENCE TRAJECTORY DATA 903

GENERATE CURRENT AND FUTURE SETPOINTS AT AUXILIARY MPC BASED ON REFERENCE TRAJECTORY DATA 908

PROVIDE CURRENT SETPOINT DATA TO MULTI-CHANNEL MANAGER 904

PROVIDE CURRENT SETPOINT DATA TO MULTI-CHANNEL MANAGER 909

EXCHANGE FUTURE SETPOINT DATA WITH AUXILIARY MPC 905

EXCHANGE FUTURE SETPOINT DATA WITH PRIMARY MPC 910

GENERATE PREDICTED TRAJECTORY DATA BASED ON RECEIVED FUTURE SETPOINT DATA 906

GENERATE PREDICTED TRAJECTORY DATA BASED ON RECEIVED FUTURE SETPOINT DATA 911

GENERATE SAFETY REACTION BASED ON EVALUATION OF PREDICTED TRAJECTORY DATA FROM PRIMARY MPC AND SECONDARY MPC TO DETECT HAZARDOUS MOTION PLANS 912

MULTI-CHANNEL MANAGER USES SAFETY REACTION TO CHOOSE CURRENT SETPOINT DATA 913

END 914

Figure 9

CROSS-CHANNEL SAFETY ANALYSIS OF REDUNDANT MPC-BASED VEHICLE CONTROLLERS IN AUTONOMOUS SYSTEMS

BACKGROUND OF THE INVENTION

Field of the Invention

The present invention is directed in general to automotive safety systems. In one aspect, the present invention relates to autonomous vehicle (AV) systems and methods of operating same to assist with vehicle operation.

Description of the Related Art

One of the fastest growing segments in the automotive electronics industry is in Advanced Driver Assistance System (ADAS) technologies which reflect a rising interest in road and traffic safety. In operation, vehicles with ADAS systems can use one or more vehicle control system channels to detect and classify objects, alert the driver of hazardous road conditions and/or control the vehicle (e.g., automatically decelerate or stop the vehicle) based on the sensed vehicle situation. Each vehicle control system channel may include environment sensing, motion planning, and vehicle control subsystems. In operation, each environment sensing subsystem may include a variety of sensors (e.g., short and long range radars, cameras and lidars) to capture environmental inputs based on detected conditions surrounding a vehicle. In response to the environmental inputs, the motion planning subsystem generates target or reference trajectory data for the vehicle that the vehicle control subsystem tries to follow by controlling the vehicle actuators (e.g., acceleration, braking, and steering). A trajectory is a time-ordered set of vehicle states, where each state is composed of a pose and speed. The pose of a vehicle, in its turn, is a combination of the position and orientation.

To protect against failure of a vehicle control system channel, conventional systems will often include one or more redundant channels which are used to provide fail-operational behavior. For example, existing autonomous driving system architectures often include heterogeneous redundant channels to provide for fail-operational behavior by switching to a redundant controller if a failure is detected at a first controller. In such architectures, multiple electronic control units (ECUs) are used to implement heterogeneous redundant channels for fail-operational behavior, where each channel includes environment sensing, motion planning and vehicle control subsystems. For example, a first fully-functional nominal ECU and vehicle dynamics ECU may be used to implement a main channel with a second Automotive Safety Integrity Level (ASIL) channel that provides for cross-validation and selection, while an additional fail-degraded (or "fail over") ECU may be used to implement a second fail-degraded channel in combination with motion control processing if failure is detected at the first fully-functional nominal ECU. While such redundant architectures can safely handle channel malfunctioning, they are not capable of providing a feasibility analysis of the motion planning or vehicle control subsystems in specific channels. For example, a healthy fault-free channel can yield a motion plan that is physically impossible due to unfavorable road conditions, low braking capacity of the vehicle or high vehicle mass. Accordingly, the existing vehicle driving systems have limited safety diagnosis and testing capabilities which constrain the ability of such systems to meet the applicable safety performance requirements by conforming with design, complexity and cost constraints.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 7 depicts an example table listing of safety reactions generated by a hazardous motion plan detector in accordance with selected embodiments of the present disclosure.

FIG. 9 illustrates a simplified flow chart showing the logic for performing a cross-channel safety check and diagnosis in a multi-channel automated driving system in accordance with selected embodiments of the present disclosure.

Figure 1:
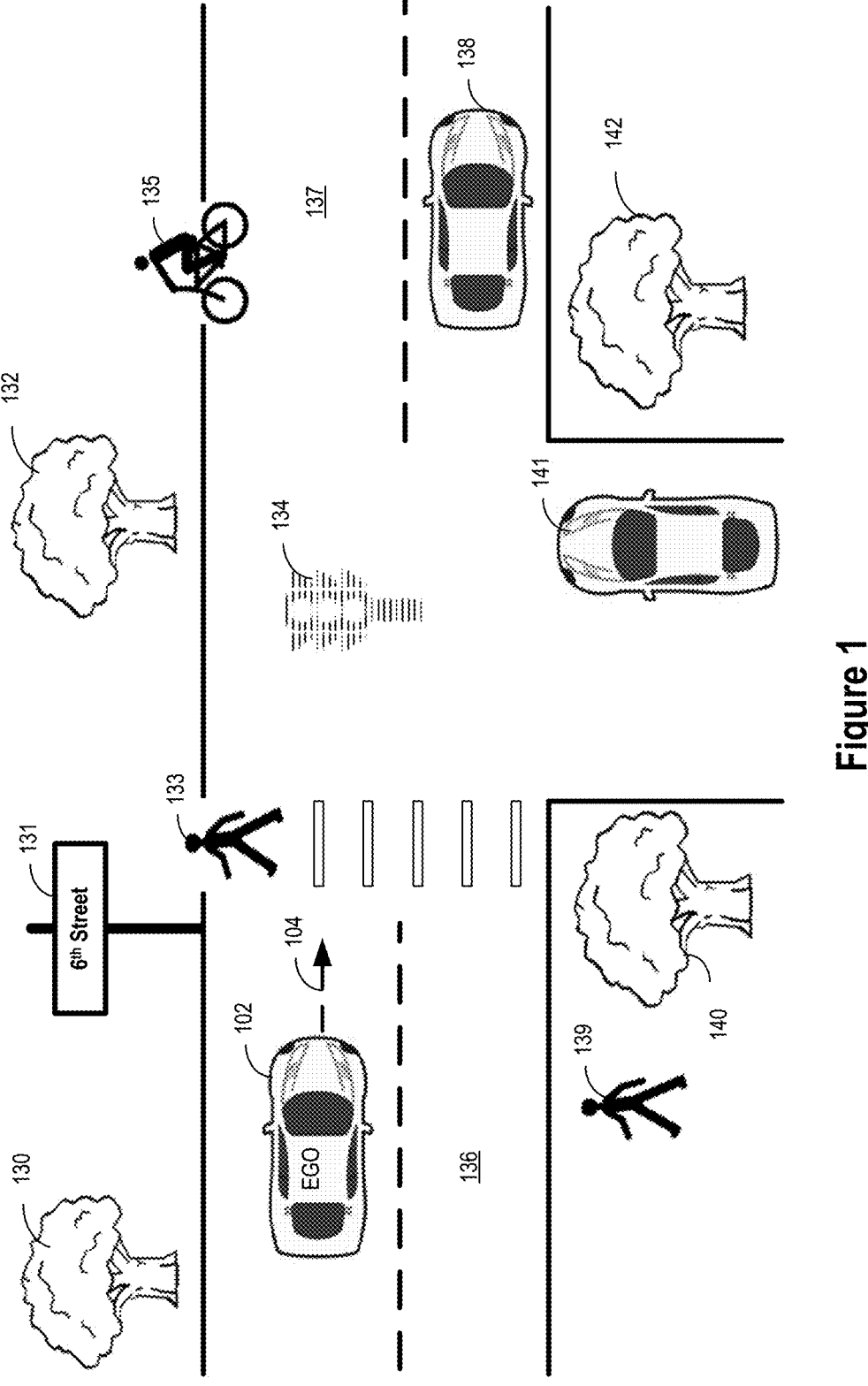
FIG. 1 depicts a simplified plan view of a vehicle which includes various sensors, vision systems, controllers, and communications systems in accordance with selected embodiments of the present disclosure.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A vehicle driving apparatus, system, method, and program code are described for performing cross-channel safety analysis of redundant MPC-based vehicle controllers in an autonomous driving system. In selected embodiments, a vehicle driving system performs cross-channel analysis by configuring two or more MPC-based vehicle control subsystems to receive reference input trajectory data from one or more motion planning subsystems. At a first MPC-based vehicle control subsystem, the reference input trajectory data is processed with a first vehicle plant model to generate predicted trajectory data which predicts the vehicle's future motion. In addition, the vehicle driving system is configured to feed the predicted trajectory data from the first MPC-based vehicle control subsystem to a second or redundant MPC-based vehicle control subsystem where it is processed by a second vehicle plant model to generate cross-check predicted trajectory data for the vehicle. At the vehicle driving system, a hazardous motion plan detector is configured to detect if the reference input trajectory data is unsafe when indicated by comparing the predicted trajectory data (from the first MPC-based vehicle control subsystem) with the cross-check predicted trajectory data (from the second or redundant MPC-based vehicle control subsystem). Depending on the comparison results, the hazardous motion plan detector can generate one or more safety reactions which are processed by a multi-channel manager or arbitrator to output vehicle actuator setpoints and/or warnings for the vehicle driver. As seen from the foregoing, the disclosed vehicle driving apparatus, system, method, and program code perform cross-channel safety analysis for automotive systems with redundant MPC-based controllers by leveraging otherwise unused or discarded future setpoints from redundant MPCs to generate additional predicted trajectories and to detect hazardous motion plans caused by faults or functional insufficiencies in the vehicle control system.

To provide additional details for an improved contextual understanding of selected embodiments of the present disclosure, reference is now made to FIG. 1 which depicts a simplified plan view 100 of an ego vehicle 102 which includes various sensors, vision systems, controllers, and communications systems which may be used with a vehicle control system to obtain information on the vehicle's surrounding environment 130-142. As used herein, the term "ego vehicle" refers to the vehicle that contains the sensors that perceive the environment around the vehicle. For example, the front of the ego vehicle 102 may include long-range sensors (e.g., long-range radar) for use with adaptive cruise control applications. The ego vehicle 102 may also include lidar sensors at the front of the vehicle for use with emergency braking, pedestrian detection, and/or collision avoidance applications. In addition, a front vision system, such as a camera, provides images towards the front of the ego vehicle 102 for use with traffic sign recognition applications and/or lane departure warning applications. On the sides of the ego vehicle 102, a side view system, such as a camera, provides surround views for at least part of the side views. Similarly, a rear vision system, such as a camera, provides images towards the rear of the ego vehicle 102 typically for use with park assistance and/or surround view applications. For closer monitoring, the ego vehicle 102 may include short or medium-range sensors (e.g., radar) at the front for use with cross traffic alert applications and at the rear for use with rear collision warning applications. In addition, the ego vehicle 102 may include short or medium-range sensors on the sides for blind spot applications. Finally, the ego vehicle 102 may include short-range sensors, such as ultrasound sensors, at the front and back of the vehicle for use with park assist control. Though not explicitly shown, it will be appreciated that any suitable type and connection of sensors can be used and connected with a GPS system and vehicle-to-infrastructure (V2X) communications system to provide communications between the ego vehicle 102 and other structures, such as other vehicles 141, roadside systems 134, and the like.

Based on vehicle sensor inputs, the ego vehicle 102 can detect safety conflicts as the ego vehicle 102 travels along a travel path 104 on the drivable space or road 136-137. Using at least the configuration of sensor systems/subsystems, the ego vehicle 102 is made aware of various objects, traffic control input, roads, etc. 130-142 that are present in the world environment 100. Awareness of such objects, traffic control input, roads, etc. allows the ego vehicle 102 to continue along the travel path 104 without safety conflicts, such as a collision with the pedestrian 122.

Objects in world environment 100 can be stationary, moving, or stationary one moment and moving a moment later. Examples of stationary objects can include trees 130, 132, 140, 142. Moving objects can include other vehicles 138, 141 and cyclists 135. Examples of stationary objects that can become moving objects can include pedestrians 133, 139. In addition, traffic control lights 134 and signs 131 can also be considered as stationary objects. Furthermore, the drivable space or a road 136-137 is a stationary part of world environment 100. Because the location of the ego vehicle 102 and other objects in the world environment 100 can change or move over time, potential safety conflicts or safety threats are constantly changing. Therefore, the safety conflicts for a given travel path 104 are predicted at the ego vehicle 102 based on a snapshot of the stationary and/or moving objects 130-142 at a moment in time during various projected times in the future.

To obtain this snapshot information, the different sensors and inputs on the ego vehicle 102 can detect the objects 130-142 in world environment 100 as three-dimensional geometric objects having associated spatial dimensions. In selected embodiments, the configuration of sensors and systems/subsystems on the ego vehicle 102 may assemble, for each detected object 130-142, a three-dimensional box and/or or other data structure having an associated position, orientation, direction and speed. For example, the ego vehicle 102 may detect and assemble a first data structure including the position, orientation, direction and speed of the ego vehicle 102, and may also assemble additional data structures with the position, orientation, direction, and speed for the other vehicles 138, 141. In addition, the ego vehicle 102 may detect and assemble data structures with the position, orientation, direction and speed for the pedestrians 133, 139 and other road users (e.g., bicyclist 135). The ego vehicle 102 may also detect and assemble data structures for stationary objects, such as the road curvature, width, and lane geometries of the drivable space or a road 136-137; the position and shape of the trees 130, 140, 142, traffic signs 131, 134, road markings, houses, etc. Furthermore, all the data structures may include a list of their anticipated or projected values for the future time moments.

In addition to environmental position/speed sensors and inputs, the ego vehicle 102 may include a vehicle driving control system which uses one or more vehicle control system channels to detect and classify the objects 130-142, alert the driver of hazardous road conditions and/or control the ego vehicle 102 based on the sensed vehicle situation. As will be appreciated, each vehicle control system channel may include an environment sensing subsystem (which captures environmental inputs based on detected conditions surrounding the vehicle), a motion planning subsystem (which generates trajectory data for the vehicle 102), and an MPC-based vehicle control subsystem (which seeks to implement the trajectory data by controlling the vehicle actuators). And as described more fully hereinbelow, each vehicle control system channel is communicatively coupled to a cross-channel safety analytics module which performs cross-channel safety analysis of redundant MPC-based vehicle controllers to detect, and/or prevent unsafe motion plan setpoint data from being provided to the vehicle actuators.

Figure 2:
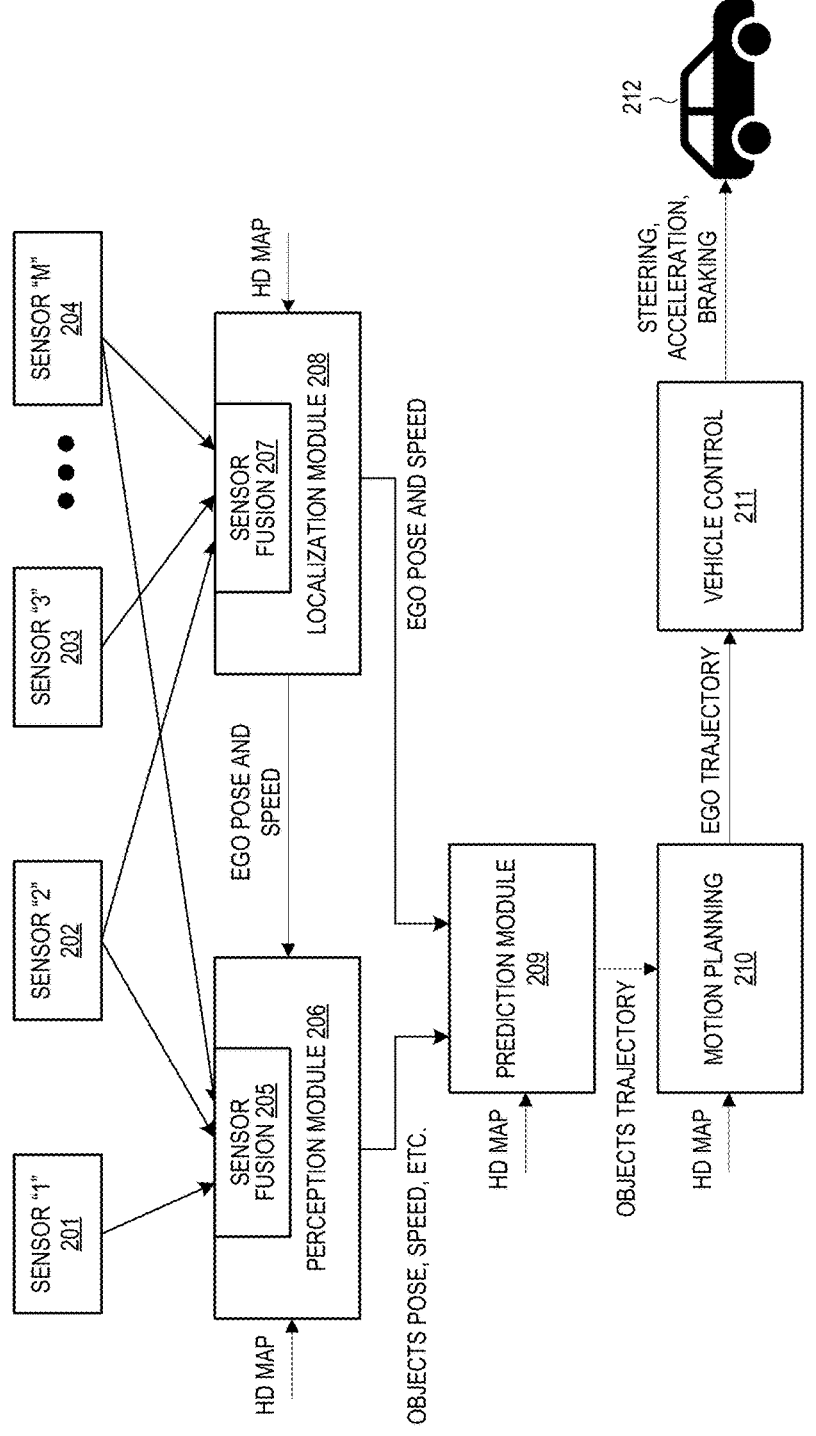
FIG. 2 depicts a simplified block diagram of an automated driving channel in accordance with selected embodiments of the present disclosure.

To provide additional details for an improved understanding of selected embodiments of the present disclosure, reference is now made to FIG. 2 which depicts a simplified block diagram of an automated driving channel 200 in accordance with selected embodiments of the present disclosure. In certain embodiments, the automated driving channel 200 is implemented in a self-driving, autonomous driving, or Highly Automated Driving (HAD) vehicle, such as ego vehicle 102. The automated driving channel 200 includes one or more sensors, such as sensor "1" 201, sensor "2" 202, sensor "3" 203 through sensor "m" 204, where each sensor can be configured to collect data or information as to objects of the world environment surrounding the vehicle. Each of the sensors 201-204 can be implemented to collect different inputs from the world environment and can be placed on different locations of the vehicle. In addition, each sensor can be part of other data/input collecting or gathering systems, such as optical, camera, radar, lidar, sonar, heat, global navigation satellite system (GNSS), inertia, velocity, cellular telephone, etc. Though not shown, it will be appreciated that other inputs can also be included, including but not limited to determined travel way points, activation commands, inputs from other non-sensor implemented systems, etc.

As depicted, each sensor 201-204 can provide world environment data or information to one or both of the perception module 206 and localization module 208 which provide the autonomous system with the ability to collect information and extract relevant knowledge from the environment. In particular, the perception module 206 is configured to develop a contextual understanding of environment, such as where obstacles are located, detection of road signs/marking, and categorizing data by their semantic meaning. In addition, the localization module 208 is configured to determine the position and with respect to the environment. The localization module 208 is connected to receive high definition map data for use in processing received sensor data (e.g., images, coordinates, target lists, point colds, wheel speed, etc.) to determine, for the ego vehicle, corresponding pose and speed information. Similarly, the perception module 206 is connected to receive high definition map data for use in processing the received sensor data, along with the ego vehicle's corresponding pose and speed information, to determine, for each detected object, a corresponding pose, speed classification, drivable space, and other properties.

As will be appreciated, different types of data or information can be collected or gathered from the sensors 201-204. Different sensors can have inherent advantages or disadvantages from one another. For example, an optical-based sensor has different qualities compared to a radar-based sensor. Furthermore, as in subsystems, homogenous or heterogeneous redundancy can be implemented for sensors to address potential failures in a sensor(s) and provide a backup(s). To accommodate a diversity of sensor inputs, the perception module 206 and localization module 208 may each include sensor fusion components, such as sensor fusion components 205, 207 which are implemented as part of the respective subsystems 206, 208. Sensor fusion components can receive data or information input from various sensors 201-204 and other inputs. The sensor fusion components can achieve a sense of sensor heterogeneity or diversity by receiving input from different sensors and/or different sensor types. For example, sensor fusion component 205 receives data or information input from sensor "1" 201, sensor "2" 202, and sensor "m" 204. Sensor fusion component 207 receives data or information input from sensor "2" 202, sensor "3" 203, and sensor "m" 204.

As depicted, the prediction module 209 is connected to receive high definition map data for use in processing the outputs from the perception module 206 and localization module 208. In particular, the prediction module 209 is configured to compute objects trajectory data which fore-casts the trajectories and actions of detected dynamic objects in the next few seconds. In turn, the motion planning module 210 is connected to receive high definition map data for use in processing the objects trajectory data outputs from the prediction module 209 to generate a motion plan which includes the desired or reference trajectory for the ego vehicle. In response to the ego reference trajectory data, the vehicle control module 211 is configured to manipulate, control or use the vehicle actuators (i.e., steering, brakes, throttle, etc.) at the vehicle 212 to execute the planned motion.

In certain implementations, a self-driving or autonomous driving vehicle, such as an ego vehicle, may have a plurality of automated driving channels 200 which are heterogenous from one another and which implement different algorithms, such as artificial intelligence (AI), machine learning (ML), neural network, formally-defined algorithms, rule-based algorithms, etc. in calculating outputs, such a world models or path plans. In such embodiments, a plurality of motion planning modules 210 are connected to generate reference trajectory data inputs for a corresponding plurality of vehicle control modules 211 which may each be implemented with a model predictive controller design.

Figure 3:
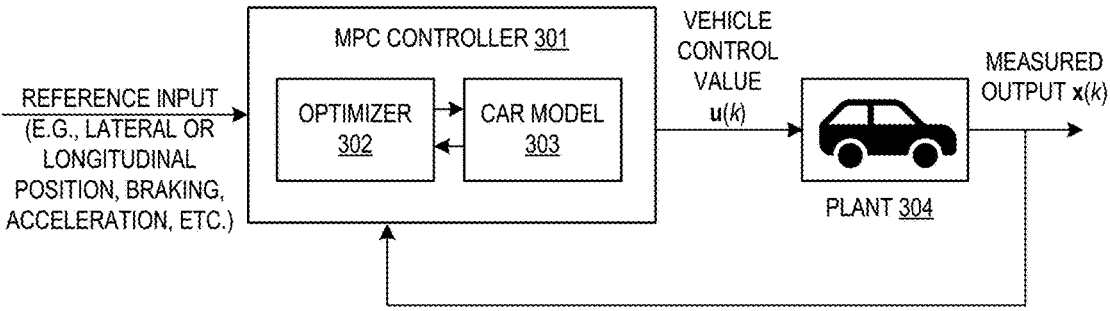
FIG. 3 depicts a simplified schematic block diagram of a lateral steering system controller in accordance with selected embodiments of the present disclosure.

To provide additional details for an improved contextual understanding of selected embodiments of the present disclosure, reference is now made to FIG. 3 which depicts a simplified schematic block diagram of a lateral steering system controller 300 which may be used in vehicle control modules. In selected automotive driving system embodiments, the lateral steering system controller 300 may be implemented with a Model Predictive Controller (MPC) 301 which implements a vehicle control algorithm to provide vehicle control values to an automobile process or plant model 304 and receive feedback of measured outputs from the automobile process or plant model 304 to optimize the vehicle control values. While MPC controllers can be used to optimize lateral and/or longitudinal controls, the depicted example embodiment of the MPC controller 301 illustrates a lateral steering control for purposes of simplification.

As depicted, the MPC controller 301 is connected to receive a reference input for controlling the vehicle motion. For example, the reference input may specify a target lateral position, but may also specify a target longitudinal position, braking value, acceleration value, or other target input value. The MPC controller 301 is also connected in a feedback arrangement to receive the measured output values x(k) generated by the automobile process or plant model 304. For example, the measured output values x(k) may be the measured lateral position of the vehicle. Based on these inputs, the MPC controller 301 generates a series of vehicle control values u(k) (e.g., steering wheel angle) which are provided as control inputs to the automobile process or plant model 304, where the goal of the MPC controller 301 is to determine setpoint values for the vehicle control value u(k) by solving a constrained optimization problem to that minimizes the vehicle steering costs. To this end, the MPC controller 301 includes an optimizer 302 which is connected in a feedback arrangement with a vehicle or car model 303 which enables prediction of car (plant) states in future based on input steering wheel angles. In operation, the MPC controller 301, at each control step k, first measures the current state of the system, x(k). Then, the MPC controller 301 uses the optimizer 302 to determine which control input vehicle control value u(k) to provide to the car model 303 by finding the actions that, over a prediction horizon of N time steps, give the best predicted performance according to a given objective function. The control input vehicle control values u(k) determined for the first prediction step are applied to the plant 304 by applying the first computed control input to the automobile process or plant model 304 and ignoring the following ones, and the MPC controller 301 then transitions to a new state, x(k+1), and the cycle restarts.

Figure 4:
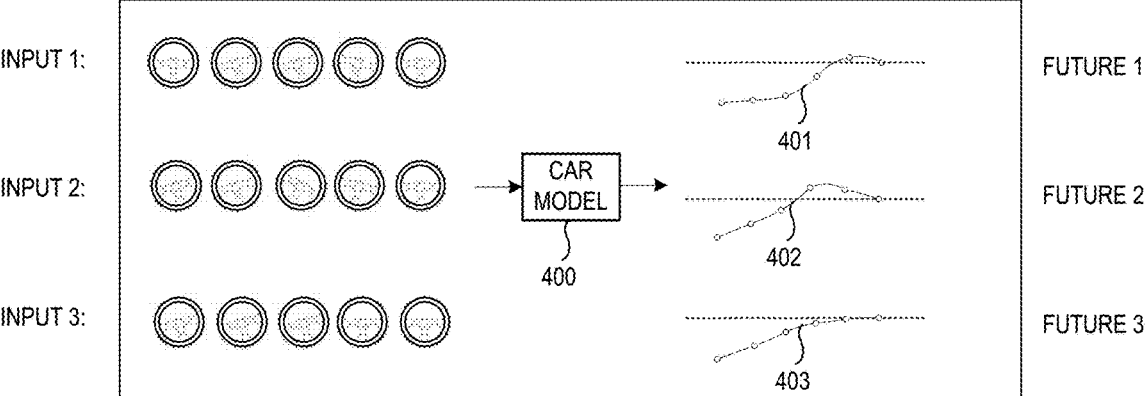
FIG. 4 illustrates how a car model predicts future vehicle positions for different steering wheel inputs.

To provide additional details for an improved contextual understanding of selected embodiments of the present disclosure, reference is now made to FIG. 4 which provides a visual illustration of the operation of a car model 400 which predicts future vehicle positions 401-403 for different steering wheel inputs (Inputs 1-3) to steer the vehicle towards the reference input value (e.g., lateral position). As illustrated, the first input steering wheel angle setpoints (Input 1) may start with a straight steering wheel angle, followed by two "left" steering wheel angles and then a strong "right" steering wheel angle before returning to a straight steering wheel angle. At the car model 400, the first input steering wheel angle setpoints (Input 1) are processed to generate a first set of predicted or future vehicle position states 401 where the vehicle is slightly over-steered. In contrast, the second input steering wheel angle setpoints (Input 2) may start with two "left" steering wheel angles, followed by a strong "right" steering wheel angle and then a less strong "right" steering wheel angle before returning to a straight steering wheel angle. At the car model 400, the second input steering wheel angle setpoints (Input 2) are processed to generate a second set of predicted or future vehicle position states 402 where the vehicle is slightly over-steered. Finally, the third input steering wheel angle setpoints (Input 3) may start with three "left" steering wheel angles, followed by two "straight" steering wheel angles. At the car model 400, the third input steering wheel angle setpoints (Input 3) are processed to generate a third set of predicted or future vehicle position states 403 where the vehicle is not over-steered. In this way, the car model 400 predicts different lateral positions for different inputs 1, 2 and 3.

Figure 5:
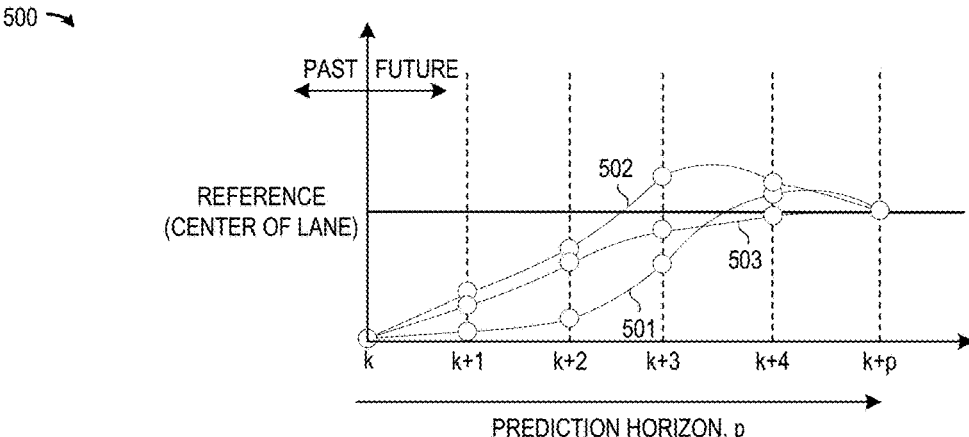
FIG. 5 graphically depicts different future vehicle position predictions for different steering wheel inputs.

To provide additional details for an improved contextual understanding of selected embodiments of the present disclosure, reference is now made to FIG. 5 which provides a graphical depiction 500 of different overlayed future vehicle position predictions 501-503 which are discretely calculated for different steering wheel inputs in relation to a reference lateral position input value. At each control step k, k+1, etc. through the prediction horizon p, the car model predicts future vehicle positions 501-503 for steering wheel input sequences 1-3 in relating to the reference input target lateral position. By using the optimizer to search the car model predicts future vehicle positions 501-503 for the best way to achieve the reference using the reference input target lateral position, the MPC controller provides steering wheel angle inputs to the plant to steer the car towards the reference lateral position.

With multiple automated driving channels, one or more redundant driving channels can be used to address events when a specific driving channel fails. Implementation of redundant heterogenous channels can address systemic or design errors in a specific channel implementation, such as hardware or software errors. However, even with redundant channels, situations can arise when a motion plan is generated that cannot feasibly be executed within safety margins for current vehicle dynamics. Such motion plan errors can cause the ego vehicle to leave the drivable space or designated geofenced area, as well as fully lose control and start skidding, sliding, or rolling over. For example, a motion plan may generate actuation setpoints that fail to steer the ego vehicle along the safe ego trajectory due to sensor failures in the environment sensing subsystem, performance limitations of the hardware/software platform or specification insufficiencies in the motion planning subsystem, and/or functional insufficiencies of the vehicle control subsystem. Such functional insufficiencies can easily lead to disengagement of autonomous operation, or even loss of control over the vehicle. To address these deficiencies and others from conventional solutions, there is disclosed herein a cross-channel safety analysis between vehicle controllers from the redundant channels to predict potential hazardous behavior. Such analysis will use the ego trajectory from one channel and feed it into the plant model of the MPC from another channel which generates a predicted ego motion which can be used to assess whether the input trajectory is safe and/or to generate safety performance indicators for each channel, motion planners, and vehicle controllers for further safety analysis. The benefit of the disclosed cross-channel extension to the redundant autonomous system is detection of unsafe maneuvers by leveraging predictions of plant models in multiple MPC controllers.

Figure 6:
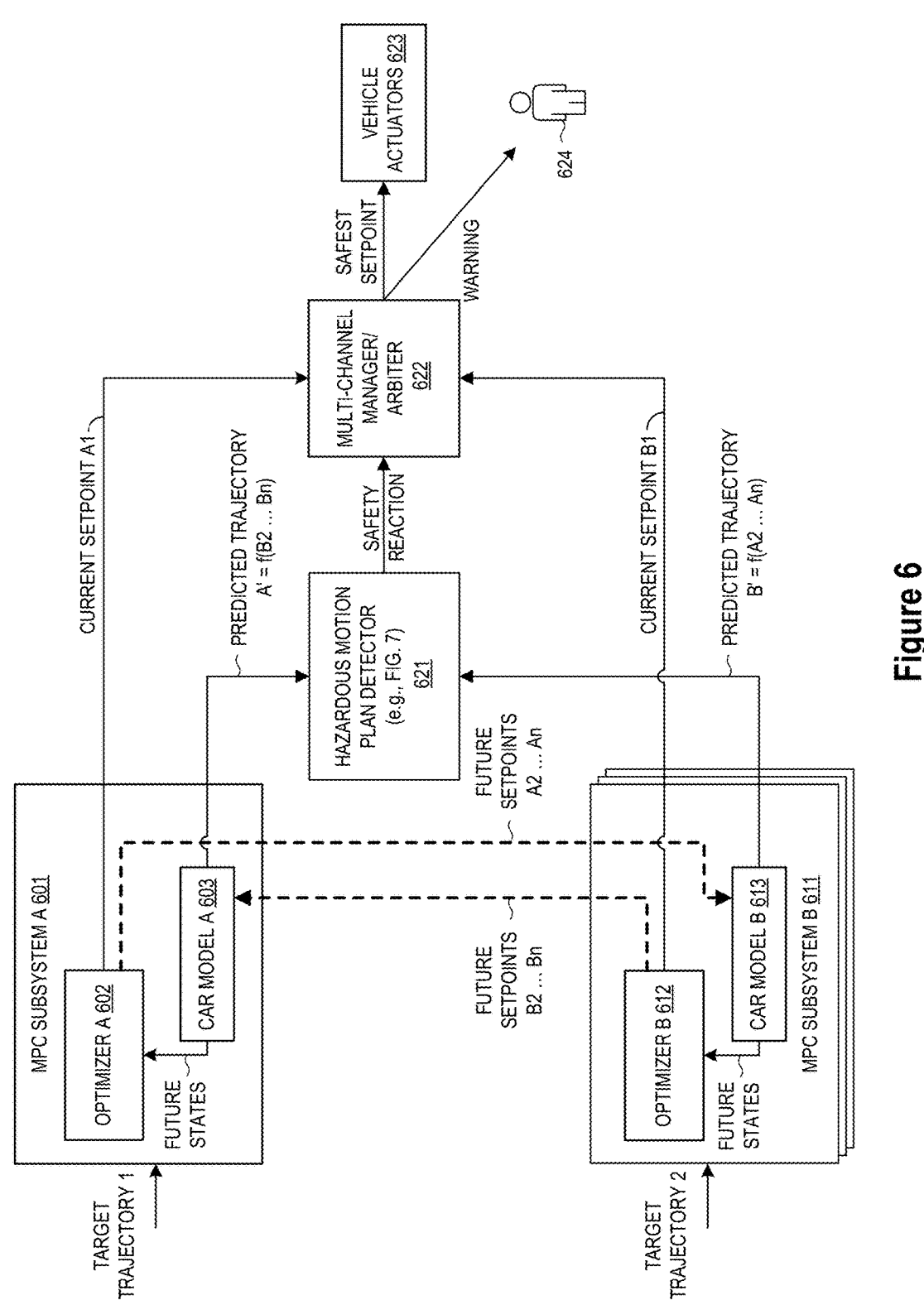
FIG. 6 depicts a block diagram of a cross-channel safety analysis system for using redundant model predictive controllers to perform cross channel safety analysis in accordance with selected embodiments of the present disclosure.

To provide additional details for an improved understanding of selected embodiments of the present disclosure, reference is now made to FIG. 6 which depicts a simplified block diagram of a cross-channel safety analysis system 600 for using one or more redundant model predictive controller (MPC) subsystems 601, 611 to perform cross channel safety analysis for a first channel associated with an ego vehicle. In this example, the first MPC subsystem 601 may be part of a first channel for the ego vehicle, while a second MPC subsystem 611 may be part of a redundant channel which is used to provide cross-channel safety analysis of the future setpoints generated by the first MPC subsystem 601. Conversely, the second MPC subsystem 611 may be part of a channel being evaluated for safety operation, and the first MPC subsystem 601 may be the redundant channel which is used to provide cross-channel safety analysis of the future setpoints generated by the second MPC subsystem 611.

To perform cross-channel safety analysis, each MPC subsystem 601, 611 is connected to a hazardous motion plan detector 621 which is configured to detect hazardous motion plans by comparing predicted trajectory states A', B' that are generated, respectively, by the MPC subsystems 601, 611. In addition, each MPC subsystem 601, 611 is connected to a multi-channel manager or arbitration circuit/module 622 which is configured to select the "safest" setpoint from the current setpoints A1, B1 provided by the MPC subsystems 601, 611 based on the safety reaction provided by the hazardous motion plan detector 621. In operation, each MPC subsystem 601, 611 is connected to receive a reference or target trajectory input (e.g., Target Trajectory 1, Target Trajectory 2), and is configured to process the reference or target trajectory input to generate the current and future setpoints A1-An, B1-Bn. To this end, each MPC subsystem 601, 611 also includes an optimizer 602, 612 and a corresponding car model 603, 613 which are respectively configured to compute future vehicle states based on a given setpoint list. As will be appreciated, the reference or target trajectory inputs (e.g., Target Trajectory 1, Target Trajectory 2) provided to the MPC subsystems 601, 611 may be unique or independent from one another. In addition, the first MPC subsystem 601 may include an optimizer A 602 and car model A 603 which are different from the optimizer B 612 and car model B 613 in the second MPC subsystem 611.

When cross-connected, each optimizer (e.g., 602) generates current and future setpoints (e.g., A1-An) for output by the corresponding MPC subsystem (e.g., 601), where the current setpoint (A1) is provided to the multi-channel manager 622 and where the future setpoints (e.g., A2-An) are provided to the car model (e.g., 613) in the other cross-connected MPC subsystem (e.g., 611). In addition, each car model (e.g., 603) is connected to receive future setpoints (e.g., B2-Bn) from the optimizer (e.g., 612) in the other cross-connected MPC subsystem (e.g., 611) and to generate therefrom predicted trajectory states (e.g., A') as a function of the future setpoints provided by the car model of the cross-connected MPC subsystem (e.g., A'=f(B2 . . . . Bn)). Thus, the optimizer A 602 at the first MPC subsystem 601 generate setpoints A1-An and provide the future setpoints A2-An to the car model B 613 at the MPC subsystem 611. In turn, the car model B 613 and optimizer B 612 generate the setpoints B1-Bn and provide the future setpoints B2-Bn to the car model A 603 which generates the predicted trajectory states A'=f(B2 . . . . Bn). Similarly, the optimizer B 612 at the second MPC subsystem 611 generates setpoints B1-Bn and provides the future setpoints B2-Bn to the car model A 603 at the MPC subsystem 601. In turn, the car model A 603 and optimizer A 602 generate the setpoints A1-An and provide the future setpoints A2-An to the car model B 613 which generates the predicted trajectory states B'=f(A2 . . . . An). As a result, the predicted trajectory states A'=f(B2 . . . . Bn), B'=f(A2 . . . . An) are evaluated at the hazardous motion plan detector 621.

As seen from the foregoing, the cross-channel safety analysis system 600 uses the MPC subsystems 601, 611 to provide a plurality of independent motion planners which are more than are typically included with an ADAS system and which is similar to full-fledged automated driving systems. Each MPC subsystem 601, 611 receives a unique reference or target trajectory input, with Trajectory 1 being supplied to the MPC Subsystem A 601 and with Trajectory 2 being supplied to MPC Subsystem B 611. The hazardous motion plan detector 621 is connected and configured to identify that that a reference or target trajectory is unsafe by analyzing the resulting vehicle dynamics generated as predicted trajectory states A', B' by the car models 603, 613 and optimizers 602, 612. In other embodiments, the hazardous motion plan detector 621 may be configured to verify predicted trajectories A' and B' with respect to the unique reference or target trajectory inputs Target Trajectory 2 and Target Trajectory 1, respectively. Note that this link is not shown in FIG. 6 in order to reduce cluttering. If there is a minimum or substantial difference between the predicted trajectories A' and B', then the hazardous motion plan detector 621 can issue a safety reaction. In response to a safety reaction, the multi-channel manager (MCM) 622 issues the safest current setpoint to the vehicle actuators 623 and/or takes other appropriate action to reduce safety risk or otherwise a warning to the passenger or driver 624.

As will be appreciated, the hazardous motion plan detector 621 can issue any suitable safety reaction for reducing potentially hazardous vehicle behavior or otherwise promoting fail-operational behavior. For example, the safety reaction can prompt the MCM 622 to switch or arbitrate between current setpoints A1, B1 from different channels to follow a safer trajectory from another channel when the hazardous motion plan detector 621 observes safety issues only in one channel. In addition or in the alternative, the safety reaction can prompt the MCM 622 to implement a safety maneuver. In addition or in the alternative, the safety reaction can prompt the MCM 622 to disengage an automated driving mode. In addition or in the alternative, the safety reaction can prompt the MCM 622 to issue a warning to the passenger or driver 624.

As will be appreciated, the cross-channel safety analysis may be applied with multiple redundant vehicle controllers and channels. For example, there may be three or more MPC subsystems (e.g., the ego vehicle MPC subsystem 601 and multiple instances of the MPC subsystem 611), in which case the cross-channel analysis will involve N*N predicted trajectory computations, where N is the number of channels. In such embodiments, the hazardous motion plan detector 621 can identify risks in all these predictions and forward requests for safety reactions to the MCM 622.

To provide additional details for an improved understanding of selected embodiments of the present disclosure, reference is now made to FIG. 7 depicts an example table listing 700 of safety reactions that may be generated by a hazardous motion plan detector. In this example, it is assumed that a first MPC controller (e.g., MPC A) is active and feeds multi-channel manager with setpoints for the vehicle actuator on the ego vehicle. In addition, it is assumed that the hazardous motion plan detector is connected to receive the predicted trajectory inputs A'=f(B2 . . . . Bn) from the first MPC controller, and is also connected to receive the predicted trajectory inputs B'=f(A2 . . . . An) from a second MPC controller (e.g., MPC B). Based on the status of inputs to the hazardous motion plan detector listed in the first four columns of the table listing 700, the hazardous motion plan detector may issue one or more safety reactions listed in the "safety reaction" column along with a description in the "comment" column.

For example, when cross-channel analysis at the hazardous motion plan detector determines that the predicted trajectories A', B' are both safe and resemble their corresponding target or reference trajectory values (Trajectory 2, Trajectory 1), then the first row 701 in the table 700 shows that no safety reaction is required. This safety reaction indicates that the ego vehicle is operating safely.

In addition, when cross-channel analysis at the hazardous motion plan detector determines that the predicted trajectory A' is not safe, and also determines that the predicted trajectory B' is safe and that the predicted trajectories A', B' both resemble their corresponding reference trajectory values (Trajectory 2, Trajectory 1), the second row 702 in the table 700 shows a passenger warning should be issued. In this case, the passenger warning may indicate there is a suspicious reference trajectory value (Trajectory 2) to the second MPC controller (MPC B), potentially indicating that the second MPC controller is not safe.

In addition, when cross-channel analysis at the hazardous motion plan detector determines that the predicted trajectory A' does not resemble the second reference trajectory value (Trajectory 2), and also determines that the predicted trajectory A' is safe and that the predicted trajectory B' is safe and resembles the corresponding reference trajectory value (Trajectory 1), the third row 703 in the table 700 shows a passenger warning should be issued. In this case, the passenger warning may indicate there is a car model mismatch between the MPC controllers, but that the setpoints are safe according to both channels.

In addition, when cross-channel analysis at the hazardous motion plan detector determines that the predicted trajectory A' is not safe and does not resemble the second reference trajectory value (Trajectory 2), and also determines that the predicted trajectory B' is safe and resembles the corresponding reference trajectory value (Trajectory 1), the fourth row 704 in the table 700 shows a passenger warning should be issued. In this case, the passenger warning may indicate that there is suspicious operation at the second MPC controller (MPC B).

In addition, when cross-channel analysis at the hazardous motion plan detector determines that the predicted trajectory B' is not safe, and also determines that the predicted trajectory A' is safe and that the predicted trajectories A', B' both resemble their corresponding reference trajectory values, the fifth row 705 in the table 700 shows a passenger warning should be issued and that the multi-channel manager should switch channels to the second MPC controller (MPC B). In this case, the passenger warning may indicate there is a suspicious reference trajectory value input to the first MPC controller (MPC A), potentially indicating that the first MPC controller is not safe.

In addition, when cross-channel analysis at the hazardous motion plan detector determines that the predicted trajectory B' does not resemble the first reference trajectory value (Trajectory 1), and also determines that the predicted trajectory B' is safe and that the predicted trajectory A' is safe and resembles the corresponding reference trajectory value (Trajectory 2), the sixth row 706 in the table 700 shows a passenger warning should be issued. In this case, the passenger warning may indicate there is a car model mismatch between the MPC controllers, but that the setpoints are safe according to both channels.

In addition, when cross-channel analysis at the hazardous motion plan detector determines that the predicted trajectory B' is not safe and does not resemble the second reference trajectory value (Trajectory 1), and also determines that the predicted trajectory A' is safe and resembles the corresponding reference trajectory value (Trajectory 2), the seventh row 707 in the table 700 shows a passenger warning should be issued and that the multi-channel manager should switch channels to the second MPC controller (MPC B). In this case, the passenger warning may indicate that there is suspicious operation at the first MPC controller (MPC A).

In addition, when cross-channel analysis at the hazardous motion plan detector determines that the predicted trajectory A' is safe but does not resemble the second reference trajectory value (Trajectory 2), and also determines that the predicted trajectory B' is safe but does not resemble the corresponding reference trajectory value (Trajectory 1), the eighth row 708 in the table 700 shows a passenger warning should be issued. In this case, the passenger warning may indicate there is a car model mismatch between the MPC controllers, but that the setpoints are safe according to both channels.

In addition, when cross-channel analysis at the hazardous motion plan detector determines that the predicted trajectories A', B' are not safe and do not resemble their corresponding target or reference trajectory values (Trajectory 2, Trajectory 1), the ninth row 709 in the table 700 shows a passenger warning should be issued and that a safe maneuver be executed. In this case, a safe maneuver may include an emergency stop or evasive maneuver, and is used when no safe MPC is available.

Referring back to FIG. 6, it will be appreciated that the cross-channel safety analysis system 600 may require higher system level costs in terms of multiple motion planning modules (e.g., 210) to track, process and control for multiple channels but it enables allows for safer operation and fewer disengagements. This is reflected by the fact that two, independent reference or target trajectory inputs (Trajectory 1, Trajectory 2) are provided as separate inputs to the MPC subsystems 601, 611 in a fully automated driving system. However, the cross-channel safety analysis system and methodology disclosed herein may also be employed with lower complexity systems, such as an advanced driver-assistance system (ADAS) where there is a lower level of automation. In ADAS systems, a single motion planner typically provides a single reference trajectory (e.g., emergency stop, lane tracking, or adaptive cruise control) that is a shared input to both MPC subsystems 601, 611. In such ADAS-type embodiments, there are no redundant motion planners, but there are multiple or replicated vehicle controllers. As a result, the motion plan trajectory is the same for both MPC controllers 601, 611 (e.g., Target Trajectory 1=Target Trajectory 2). This embodiment will have less ability to deal with detected vehicle risks because there is no alternative (safer) trajectory to follow, and while this negatively affect the safety of vehicle operation because it can result in quicker disengagements or an unnecessary safe stop, it has the advantage of being a less costly design that can be used even in very restricted automated driving systems.

In embodiments where a single reference trajectory as a shared input, the MPC subsystems 601, 611 are configured to compute the current step's actuation setpoints A1, B1, such as steering, acceleration and braking. In response, the multi-channel manager 622 selects one setpoint from the active channel and forwards it to the vehicle actuator 623 to drive the vehicle. For fail-operational behavior, as soon as the multi-channel manager 622 receives information about malfunctioning in a first driving channel A (e.g., MPC subsystem 601), it can switch to a hot-spare redundant channel B (e.g., MPC subsystem 611). To notify the multi-channel manager 622 about channel malfunctions, the hazardous motion plan detector 621 performs a cross-channel analysis by extracting future setpoints A2-An, B2-Bn from the MPC subsystems 601, 611, and then each MPC subsystem forwards its local future setpoints to the car (plant) model in the other cross-connected MPC subsystem which computes the future predicted states of the vehicle, such as lateral position. As a result, the predicted trajectory A' is computed based on the actuation setpoints B2-Bn from the MPC subsystem 611 and the car model A 603 in the MPC subsystem 601. In addition, predicted trajectory B' is computed as a forecast of how the vehicle will move using setpoints A2-An from the MPC subsystem 601 according to car model B 613 from the MPC subsystem 611.

As disclosed herein, the hazardous motion plan detector 621 checks the safety of incoming predicted trajectories A', B' and the shared reference trajectory to analyze the vehicle poses in future time moments, thereby detecting the potential loss of control or ego vehicle leaving drivable space or designated geofenced area, as well detecting that a vehicle will fully lose control and start skidding, sliding, tripping over or dropping (out of the sky). In particular, the hazardous motion plan detector 621 can compare the generated trajectories A', B' from the cross-channel analysis with the original reference trajectory. If the predicted trajectory B' from the MPC subsystem B 611 is unsafe, this can indicate that the reference trajectory is unsafe, or that the computed future setpoints A2-An from MPC subsystem A 601 are unsafe, or that the car model B 613 is not accurate. Depending on the vehicle-level safety case, the hazardous motion plan detector 621 can be configured to escalate the detected safety problem to safety reactions by the multi-channel manager 622. As seen from the foregoing, the cross-channel safety analysis method and system disclosed herein provides a diagnostic feature and/or safety performance indicator.

Figure 8:
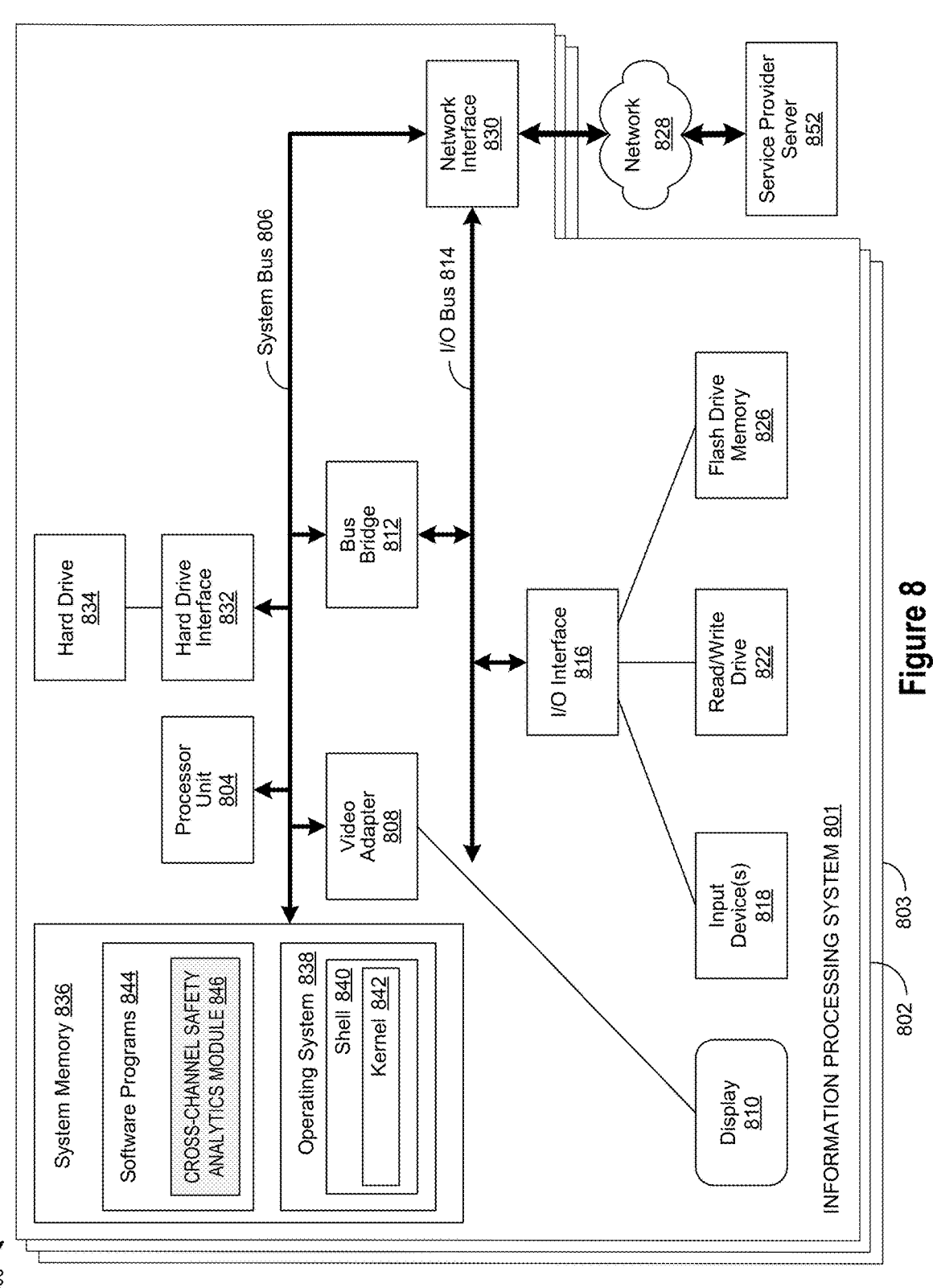
FIG. 8 depicts a block diagram of an information processing system capable of performing computing operations which use redundant model predictive controllers to perform cross-channel safety analysis in accordance with selected embodiments of the present disclosure.

To provide additional details for an improved understanding of selected embodiments of the present disclosure, reference is now made to FIG. 8 which depicts a block diagram 800 of one or more information processing systems 801-803 capable of performing computing operations which use redundant model predictive controllers to perform cross-channel safety analysis. As disclosed herein, the cross-channel safety analysis functionality may be implemented entirely in selected hardware, entirely in software (including firmware, resident software, micro-code, etc.) or in embodiments combining software and hardware aspects that may all generally be referred to herein as a "circuit," "module" or "system." Certain implementations may incorporate all, fewer, or greater than the components described herein.

The depicted information processing system 801 includes a processor unit 804 that is coupled to a system bus 806. Processor unit 804 can have various architectures, such as a system on a chip (SOC), electronic control unit (ECU), general-purpose processor, multiprocessor, custom compute accelerator, FPGA, hard-wired ASIC, etc. A video adapter 808, which controls a display 810, is also coupled to system bus 806. System bus 806 is coupled via a bus bridge 812 to an Input/Output (I/O) bus 814. An I/O interface 816 is coupled to the I/O bus 814 to provide communication with various I/O devices, including one or more input devices 818, a read/write drive 822, and a flash drive memory 826. In accordance with the present disclosure, the input devices 818 may include one or more short and long range radar, camera and/or lidar sensors. The format of the ports connected to I/O interface 816 may be any known to those skilled in the art of computer architecture, including but not limited to Universal Serial Bus (USB) ports. The information processing system 801 is able to communicate with a service provider server 852 via network 828 using a network interface 830, which is coupled to system bus 806.

A hard drive interface 832 is also coupled as an interface between the hard drive 834 and system bus 806 to populate a system memory 836, which is also coupled to system bus 806. Data that populates system memory 836 includes the operating system (OS) 838 and software programs 844 for the information handling system 801. The OS 838 includes a shell 840 for providing transparent user access to resources such as software programs 844. Generally, shell 840 is a program that provides an interpreter and an interface between the user and the operating system. More specifically, shell 840 executes commands that are entered into a command line user interface or from a file. Thus, shell 840 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 842) for processing. While shell 840 generally is a text-based, line-oriented user interface, the information handling system 801 can also support other user interface modes, such as graphical, voice, gestural, etc. As depicted, OS 838 also includes kernel 842 in which lower levels of functionality for OS 838 are implemented, including essential services required by other parts of OS 838 and software programs 844, including memory management, process and task management, disk management, and mouse and keyboard management.

The software programs 844 may include any number of applications executed by the information handling system 802. In accordance with selected embodiments of the present disclosure, one of the software programs 844 is a cross-channel safety analytics module 846 which is configured with program code to perform cross-check analysis between vehicle controllers from the redundant channels to predict potential hazardous behavior. In selected embodiments, the cross-channel safety analytics module 846 will use the ego trajectory from one channel and feed it into the plant model of the MPC from another channel which the outputs the predicted ego motion for use in assessing if the input trajectory is safe. In addition, the cross-channel safety analytics module 846 may generate safety performance indicators for each channel, motion planners, and vehicle controllers for further safety analysis.

The hardware elements depicted in the information processing system 801 are not intended to be exhaustive, but rather are representative to highlight components that can be implemented by the present disclosure. For instance, the information processing system 801 may include alternate memory storage devices. In addition, multiple information processing systems 801-802 may be used to run the cross-channel safety analysis on redundant model predictive controllers. Such a multi-computer system approach ensures freedom from interference required for many safety standards and reliability engineering practices. These and other variations are intended to be within the spirit, scope and intent of the present disclosure.

To provide additional details for an improved understanding of selected embodiments of the present disclosure, reference is now made to FIG. 9 which depicts a simplified flow chart 900 showing the logic for performing a cross-channel safety check and diagnosis in a multi-channel automated driving system in accordance with selected embodiments of the present disclosure. In an example embodiment, the control logic and methodology shown in FIG. 9 may be implemented as hardware and/or software on an electronic control unit (ECU), microcontroller unit, or digital system processor that includes processor and memory for storing programming control code for controlling the operation of autonomous vehicles using advanced driver assistance systems.

An embodiment of a method 800 for performing a cross-channel safety check and diagnosis in a multi-channel automated driving system may include steps 901-914 shown in the general order of FIG. 9, though the method may include more or fewer steps or can arrange the order of the steps differently than those shown. Generally, the method 900 starts with a start operation 901 and ends with step 914 after processing steps 902-913 which are executed as a set of computer-executable instructions by a computer system or processor and encoded or stored on a computer readable medium. In other configurations, the method 900 may be executed by a series of components, circuits, and gates created in a hardware device, such as a System of Chip (SOC), Application Specific Integrated Circuit (ASIC), and/or a Field Programmable Gate Array (FPGA). In other configurations, the method may be executed as an iterative loop where the processing steps 902-913 are periodically repeated on a predetermined schedule or on certain triggering events or when prompted by a vehicle driver.

Once the vehicle drive system starts and is operational at step 901, the vehicle's on-board sensors are activated to collect environmental data reflecting the vehicle's own perception of the environment surrounding the vehicle. In selected embodiments, the sensor data signals may be provided by vehicle's on-board sensors 201-204 to the system processor embodying the perception module 206 and localization module 208.

At step 902, reference trajectory data is received at a primary MPC, where the reference data specifies a target vehicle behavior (e.g., a target lateral position, target longitudinal position, braking value, acceleration value, or other target input value). In selected embodiments, the received reference trajectory data defines the target lateral position or pose for the ego vehicle, and is generated as part of the motion plan.

At step 903, the primary MPC generates current and future setpoints in response to the reference trajectory data. In selected embodiments, the primary MPC may use an optimizer and car model to generate a current setpoint A1 and future setpoints A2-An.

At step 904, the primary MPC provides the current setpoint data (e.g., A1) as an input to a multi-channel manager or arbiter. In selected embodiments, the current setpoint may specify the ego vehicle's near term trajectory value in terms of a steering, acceleration and braking value that will be provided to the vehicle actuator(s).

At step 905, the primary MPC exchanges future setpoints with one or more auxiliary MPCs. For example, an optimizer at the primary MPC may be connected and configured to issue the future setpoints A2-An to a car model at one or more auxiliary MPCs, and an optimizer at each auxiliary MPC may be connected and configured to issue the future setpoints B2-Bn to a car model at the primary MPC.

At step 906, the primary MPC generates predicted trajectory data based on the future setpoint data received from the auxiliary MPC(s). For example, a car model at the primary MPC may be connected and configured to issue the predicted trajectory data A'=f(B2 . . . . Bn).

Before, after or in parallel with steps 902-906, a corresponding sequence of steps 907-911 are performed at each auxiliary MPC in order to perform cross-channel safety check and diagnosis. In particular, reference trajectory data is received at an auxiliary MPC at step 907. In selected embodiments, the received reference trajectory data defines an independent target lateral position or pose for the ego vehicle, and is generated as part of the motion plan.

At step 908, each auxiliary MPC generates current and future setpoints in response to the reference trajectory data. In selected embodiments, each auxiliary MPC may use an optimizer and car model to generate a current setpoint B1 and future setpoints B2-Bn.

At step 909, each auxiliary MPC provides the current setpoint data (e.g., B1) as an input to the multi-channel manager or arbiter. In selected embodiments, the current setpoint may specify the ego vehicle's near term trajectory value in terms of a steering, acceleration and braking value that will be provided to the vehicle actuator(s).

At step 910, each auxiliary MPC exchanges future setpoints with the primary MPC. For example, an optimizer at each auxiliary MPC may be connected and configured to issue the future setpoints B2-Bn to a car model at the primary MPC, and an optimizer at the primary MPC may be connected and configured to issue the future setpoints A2-An to a car model at each auxiliary MPC.

At step 911, each auxiliary MPC generates predicted trajectory data based on the future setpoint data received from the auxiliary MPC(s). For example, a car model at the each auxiliary MPC may be connected and configured to issue the predicted trajectory data B'=f(A2 . . . An).

At step 912, a safety reaction is generated based on the evaluation of the predicted trajectory data A', B' from the primary and auxiliary MPCs to detect hazardous motion plans. In selected embodiments, a hazardous motion plan detector is connected and configured to evaluate the predicted trajectory data A', B'.

At step 913, a multi-channel manager uses the safety reaction issued by the hazardous motion plan detector to choose a current setpoint data value from between the candidate current setpoints A1, B1. In selected embodiments, the multi-channel manager chooses the safest current setpoint A1, B1 and/or issues a warning for the vehicle driver.

At step 914, the method stops or returns in an iterative loop to begin again at step 901.

As seen from the foregoing, the disclosed cross-channel analysis method, apparatus, system, and program code components enable the detection of hazardous motion plans by employing state-of-the-art concepts, such as redundant channels, MPC-based vehicle controllers, health monitoring, and arbitration without major modification. With single or multi-channel embodiments, the disclosed MPC controllers may operate independently of each other with only minor modifications to output already available information, such as computed future setpoints and predicted trajectory. And with ADAS-type embodiments which process a single shared reference trajectory, the trajectory is often simple (e.g., an emergency stop) so that corresponding computations are less error-prone. Thus, it will be appreciated that the disclosed cross-channel analysis method, apparatus, system, and program code components provide an efficient scheme for identifying safety issues, such as faults from ISO 26262 and functional insufficiencies from ISO 21448, in the MPC-based vehicle controller.

By now it should be appreciated that there has been provided a computer-implemented method, architecture, circuit, and system for performing safety analysis on one or more motion plans. In the disclosed methodology, one or more sensors on a vehicle collect a first set of sensor data signals. In selected embodiments, the first set of sensor data signals are collected by capturing sensor data signals with one or more sensors located on the vehicle which are selected from a group consisting of a camera, lidar detector, radar detector, global positioning system (GPS) unit, inertial module unit (IMU), and a microphone. The disclosed methodology also processes the first set of sensor data signals to generate one or more motion plans which include at least a first reference trajectory value for a target trajectory for the vehicle. In selected embodiments, the first set of sensor data signals are processed by a motion planning module which generates the first reference trajectory value to specify a target lateral position for the vehicle, a target longitudinal position for the vehicle, a target steering value for the vehicle, a target braking value for the vehicle, or a target acceleration value for the vehicle. In addition, the disclosed methodology processes the first reference trajectory value at a first model predictive controller to generate a first current setpoint and a first plurality of future setpoints, where the first model predictive controller is connected to receive the first reference trajectory value. In selected embodiments, the first model predictive controller processes the first reference trajectory value with a first vehicle model and a first optimizer which are configured to generate the first current setpoint and the first plurality of future setpoints in response to the first reference trajectory value. In selected embodiments, the second model predictive controller processes the second reference trajectory value with a second vehicle model and a second optimizer which are configured to generate the second current setpoint and the second plurality of future setpoints in response to the second reference trajectory value. In selected embodiments, the first vehicle model is configured to process the second plurality of future setpoints to generate the first plurality of predicted trajectory states. The disclosed methodology also processes the first plurality of future setpoints at a second model predictive controller to generate a second plurality of future setpoints, where the second model predictive controller is connected to receive a second reference trajectory value. In selected embodiments, the second model predictive controller also processes the first plurality of future setpoints with a second vehicle model which is configured to generate the second plurality of predicted trajectory states. In addition, the disclosed methodology processes the second plurality of future setpoints at the first model predictive controller to generate a first plurality of predicted trajectory states. The disclosed methodology also processes the first plurality of future setpoints at the second model predictive controller to generate a second plurality of predicted trajectory states. In addition, the disclosed methodology evaluates the first plurality of predicted trajectory states and second plurality of predicted trajectory states at a hazardous motion plan detector to generate a predetermined safety reaction for the vehicle. In selected embodiments, the hazardous motion plan detector evaluates the first plurality of predicted trajectory states and second plurality of predicted trajectory states to determine if the first plurality of predicted trajectory states is safe. In other selected embodiments, the hazardous motion plan detector evaluates the first plurality of predicted trajectory states and second plurality of predicted trajectory states to determine if the first plurality of predicted trajectory states resembles the second reference trajectory value. In other selected embodiments, the hazardous motion plan detector evaluates the first plurality of predicted trajectory states and second plurality of predicted trajectory states to determine if the second plurality of predicted trajectory states is safe. In other selected embodiments, the hazardous motion plan detector evaluates the first plurality of predicted trajectory states and second plurality of predicted trajectory states to determine if the second plurality of predicted trajectory states resembles the first reference trajectory value. The disclosed methodology also chooses between the first current setpoint and the second current setpoint based on the safety reaction to provide a safest setpoint to a vehicle actuator in the vehicle. In selected embodiments, the first reference trajectory value and the second reference trajectory value are the same reference trajectory value. In other embodiments, the first reference trajectory value and the second reference trajectory value are different reference trajectory values.

In another form, there is provided a method, system, and apparatus for performing safety analysis on one or more motion plans. In the disclosed system, one or more vehicle sensors are configured to collect first sensor data signals from an environment of a vehicle. In selected embodiments, the sensors are selected from a group consisting of a camera, lidar detector, radar detector and a microphone. The disclosed system also includes one or more processors and data storage storing instructions that, when executed by the one or more processors, cause the system to process the first set of sensor data signals to generate one or more motion plans which include a first reference trajectory value for a target trajectory for the vehicle. In selected embodiments, the system includes a motion planning module that is connected to process the first set of sensor data signals to generate the first reference trajectory value to specify a target lateral position for the vehicle, a target longitudinal position for the vehicle, a target braking value for the vehicle, or a target acceleration value for the vehicle. In addition, the disclosed system includes a first model predictive controller connected to receive and process the first reference trajectory value to generate a first current setpoint and a first plurality of future setpoints. In selected embodiments, the first model predictive controller includes a first vehicle model which processes the first reference trajectory value to generate one or more first future states, and also includes a first optimizer which is connected to the first vehicle model and configured to generate the first current setpoint and the first plurality of future setpoints in response to the first reference trajectory value and the one or more first future states. The disclosed system also includes a second model predictive controller connected to receive a second reference trajectory value and to process the first plurality of future setpoints to generate a second plurality of future setpoints which are processed at the first model predictive controller to generate a first plurality of predicted trajectory states. In selected embodiments, the second model predictive controller includes a second vehicle model which processes the first plurality of future setpoints to generate the second plurality of predicted trajectory states and one or more second future states, and also includes a second optimizer which is connected to the second vehicle model and configured to generate the second plurality of future setpoints in response to the second trajectory value. In addition, the disclosed system includes a hazardous motion plan detector connected and configured to evaluate the first plurality of predicted trajectory states and second plurality of predicted trajectory states to generate a predetermined safety reaction for the vehicle. The disclosed system also includes a multi-channel manager circuit connected and configured to choose between the first current setpoint and the second current setpoint based on the safety reaction to provide a safest setpoint to a vehicle actuator in the vehicle.

In yet another form, there is provided an apparatus for operating a vehicle having one or more vehicle sensors arrayed to collect sensor data signals characterizing an exterior environment of the vehicle. As disclosed, the apparatus includes one or more electronic control units (ECUs) connected and configured to process the first set of sensor data signals to generate one or more motion plans which include a first reference trajectory value to specify a target lateral position for the vehicle, a target longitudinal position for the vehicle, a target steering value for the vehicle, a target braking value for the vehicle, or a target acceleration value for the vehicle. In addition, the ECU(s) are connected and configured to process the first reference trajectory value at a first model predictive controller to generate a first current setpoint and a first plurality of future setpoints, where the first model predictive controller is connected to receive the first reference trajectory value. In addition, the ECU(s) are connected and configured to process the first plurality of future setpoints at a second model predictive controller to generate a second plurality of future setpoints, where the second model predictive controller is connected to receive a second reference trajectory value. In addition, the ECU(s) are connected and configured to process the second plurality of future setpoints at the first model predictive controller to generate a first plurality of predicted poses or trajectory states. In addition, the ECU(s) are connected and configured to process the first plurality of future setpoints at the second model predictive controller to generate a second plurality of predicted trajectory states. In addition, the ECU(s) are connected and configured to evaluate the first plurality of predicted trajectory states and second plurality of predicted trajectory states at a hazardous motion plan detector to generate a predetermined safety reaction for the vehicle. In addition, the ECU(s) are connected and configured to choose between the first current setpoint and the second current setpoint based on the safety reaction to provide a safest setpoint to a vehicle actuator in the vehicle. In selected embodiments, the hazardous motion plan detector evaluates the first plurality of predicted trajectory states and second plurality of predicted trajectory states to determine if the first plurality of predicted trajectory states is safe and to determine if the first plurality of predicted trajectory states resembles the second reference trajectory value. In other selected embodiments, the hazardous motion plan detector evaluates the first plurality of predicted trajectory states and second plurality of predicted trajectory states to determine if the second plurality of predicted trajectory states is safe and to determine if the second plurality of predicted trajectory states resembles the first reference trajectory value.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages.

Aspects of the present invention are described hereinabove with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In certain implementations, a system on a chip or SOC may be implemented.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the described exemplary embodiments disclosed herein focus on example autonomous driver systems, devices, and methods for using sensor data from external V2X sources to perform a cross-check diagnosis of on-board vehicle sensors, the present disclosure is not necessarily limited to the example embodiments illustrate herein. For example, various embodiments of using sound sensors may be applied in any suitable autonomous systems, and not just autonomous driver systems, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for performing safety analysis on one or more motion plans, comprising:
    collecting, by one or more sensors on a vehicle, a first set of sensor data signals;
    processing the first set of sensor data signals to generate a first motion plan comprising a first reference trajectory value for a first target trajectory for the vehicle and to generate a second motion plan comprising a second reference trajectory value for a second target trajectory for the vehicle;
    processing the first reference trajectory value at a first model predictive controller to generate a first current setpoint and a first plurality of future setpoints;
    processing the second reference trajectory value at a second model predictive controller to generate a second current setpoint and a second plurality of future setpoints;
    processing the second plurality of future setpoints at the first model predictive controller to generate a first plurality of predicted trajectory states;
    processing the first plurality of future setpoints at the second model predictive controller to generate a second plurality of predicted trajectory states;
    evaluating the first plurality of predicted trajectory states and second plurality of predicted trajectory states at a hazardous motion plan detector to generate a predetermined safety reaction for the vehicle; and
    choosing between the first current setpoint and the second current setpoint based on the safety reaction to provide a safest setpoint to a vehicle actuator in the vehicle.

2. The computer-implemented method of claim 1, where collecting the first set of sensor data signals comprises capturing sensor data signals with one or more sensors located on the vehicle which are selected from a group consisting of a camera, lidar detector, radar detector, global positioning system (GPS) unit, inertial module unit (IMU) and a microphone.

3. The computer-implemented method of claim 1, where processing the first set of sensor data signals comprises generating, with a first motion planning module, the first reference trajectory value to specify a target lateral position for the vehicle, a target longitudinal position for the vehicle, a target steering value for the vehicle, a target braking value for the vehicle, or a target acceleration value for the vehicle.

4. The computer-implemented method of claim 1, where the first reference trajectory value and the second reference trajectory value are the same reference trajectory value.

5. The computer-implemented method of claim 1, where the first reference trajectory value and the second reference trajectory value are different reference trajectory values.

6. The computer-implemented method of claim 1, where the first model predictive controller processes the first reference trajectory value with a first vehicle model and a first optimizer which are configured to generate the first current setpoint and the first plurality of future setpoints in response to the first reference trajectory value.

7. The computer-implemented method of claim 6, where the second model predictive controller processes the second reference trajectory value with a second vehicle model and a second optimizer which are configured to generate the second current setpoint and the second plurality of future setpoints in response to the second reference trajectory value.

8. The computer-implemented method of claim 7, where the second model predictive controller also processes the first plurality of future setpoints with the second vehicle model which is configured to generate the second plurality of predicted trajectory states.

9. The computer-implemented method of claim 8, where the first vehicle model is configured to process the second plurality of future setpoints to generate the first plurality of predicted trajectory states.

10. The computer-implemented method of claim 1, where the hazardous motion plan detector issues a safety reaction by evaluating the first plurality of predicted trajectory states and second plurality of predicted trajectory states to determine if the first plurality of predicted trajectory states is safe.

11. The computer-implemented method of claim 1, where the hazardous motion plan detector evaluates the first plurality of predicted trajectory states and second plurality of predicted trajectory states to determine if the first plurality of predicted trajectory states resembles the second reference trajectory value.

12. The computer-implemented method of claim 1, where the hazardous motion plan detector evaluates the first plurality of predicted trajectory states and second plurality of predicted trajectory states to determine if either the first plurality of predicted trajectory states or the second plurality of predicted trajectory states is safe.

13. The computer-implemented method of claim 1, where the hazardous motion plan detector evaluates the first plurality of predicted trajectory states and second plurality of predicted trajectory states to determine if the second plurality of predicted trajectory states resembles the first reference trajectory value.

14. A system comprising:
    one or more vehicle sensors configured to collect first sensor data signals from an environment of a vehicle;
    one or more processors and data storage storing instructions that, when executed by the one or more processors, cause the system to process the first set of sensor data signals to generate a first motion plans comprising a first reference trajectory value for a target trajectory for the vehicle and to generate a second motion plan comprising a second reference trajectory value for a second target trajectory for the vehicle;
    a first model predictive controller and a second model predictive controller,
        where the first model predictive controller is connected to receive and process the first reference trajectory value to generate a first current setpoint and a first plurality of future setpoints;
        where the second model predictive controller is connected to receive the second reference trajectory value and to generate a second current setpoint and second plurality of future setpoints, where the first model predictive controller is connected to receive the second plurality of future setpoints to generate a first plurality of predicted trajectory states, and where the second model predictive controller is connected to receive the first plurality of future setpoints to generate a second plurality of predicted trajectory states;

a hazardous motion plan detector connected and configured to evaluate the first plurality of predicted trajectory states and second plurality of predicted trajectory states to generate a predetermined safety reaction for the vehicle; and a multi-channel manager circuit connected and configured to choose between the first current setpoint and the second current setpoint based on the safety reaction to provide a safest setpoint to a vehicle actuator in the vehicle.

15. The system of claim 14, where the one or more sensors located on the vehicle are selected from a group consisting of a camera, lidar detector, radar detector and a microphone.

16. The system of claim 14, further comprising:

a first motion planning module which is connected to process the first set of sensor data signals to generate the first reference trajectory value to specify a target lateral position for the vehicle, a target longitudinal position for the vehicle, a target steering value for the vehicle, a target braking value for the vehicle, or a target acceleration value for the vehicle.

17. The system of claim 14, where the first model predictive controller comprises:

a first vehicle model and a first optimizer which are connected and configured to generate the first current setpoint and the first plurality of future setpoints in response to the first reference trajectory value and the second plurality of future setpoints.

18. The system of claim 17, where the second model predictive controller comprises:

a second vehicle model and a second optimizer which are connected and configured to generate the second plurality of future setpoints in response to the second trajectory value and the first plurality of future setpoints.

19. An apparatus for operating a vehicle comprising one or more vehicle sensors arrayed to collect sensor data signals characterizing an exterior environment of the vehicle, the apparatus comprising one or more electronic control units (ECUs) connected to:

process the first set of sensor data signals to generate a first motion plan comprising a first reference trajectory value to specify a first target lateral position for the vehicle, a first target longitudinal position for the vehicle, a first target braking value for the vehicle, or a first target acceleration value for the vehicle, and to generate a second motion plan comprising a second reference trajectory value to specify a second target lateral position for the vehicle, a second target longitudinal position for the vehicle, a second target braking value for the vehicle, or a second target acceleration value for the vehicle;

process the first reference trajectory value at a first model predictive controller to generate a first current setpoint and a first plurality of future setpoints;

processing the second reference trajectory value at a second model predictive controller to generate a second current setpoint and a second plurality of future setpoints;

process the second plurality of future setpoints at the first model predictive controller to generate a first plurality of predicted trajectory states;

process the first plurality of future setpoints at the second model predictive controller to generate a second plurality of predicted trajectory states;

evaluate the first plurality of predicted trajectory states and second plurality of predicted trajectory states at a hazardous motion plan detector to generate a predetermined safety reaction for the vehicle; and choose between the first current setpoint and the second current setpoint based on the safety reaction to provide a safest setpoint to a vehicle actuator in the vehicle.

20. The apparatus of claim 19, where the hazardous motion plan detector evaluates the first plurality of predicted trajectory states and second plurality of predicted trajectory states to determine if the first plurality of predicted trajectory states is safe and resembles the second reference trajectory value, or to determine if the second plurality of predicted trajectory states is safe and resembles the first reference trajectory value.

* * * * *